United States Patent
Erell et al.

(10) Patent No.: US 8,761,289 B2
(45) Date of Patent: Jun. 24, 2014

(54) MIMO FEEDBACK SCHEMES FOR CROSS-POLARIZED ANTENNAS

(75) Inventors: Adoram Erell, Herzliya (IL); Krishna Srikanth Gomadam, Sunnyvale, CA (US); Yan Zhang, Palo Alto, CA (US); Ezer Melzer, Tel Aviv (IL)

(73) Assignee: Marvell World Trade Ltd., St. Michael (BB)

(*) Notice: Subject to any disclaimer, the term of this patent is extended or adjusted under 35 U.S.C. 154(b) by 283 days.

(21) Appl. No.: 12/965,878

(22) Filed: Dec. 12, 2010

(65) Prior Publication Data
US 2011/0150052 A1    Jun. 23, 2011

Related U.S. Application Data

(60) Provisional application No. 61/287,652, filed on Dec. 17, 2009, provisional application No. 61/294,000, filed on Jan. 11, 2010.

(51) Int. Cl.
*H04B 7/02*     (2006.01)
*H04L 1/02*     (2006.01)

(52) U.S. Cl.
USPC ........... 375/267; 375/219; 375/260; 375/316; 375/299

(58) Field of Classification Search
USPC ......................... 375/219, 260, 267, 316, 299
See application file for complete search history.

(56) References Cited

U.S. PATENT DOCUMENTS

| | | |
|---|---|---|
| 5,231,629 A | 7/1993 | Kotzin et al. |
| 5,263,160 A | 11/1993 | Porter, Jr. et al. |
| 5,349,567 A | 9/1994 | Reed |
| 5,940,439 A | 8/1999 | Kleider et al. |
| 6,466,904 B1 | 10/2002 | Gao et al. |
| 6,512,750 B1 | 1/2003 | Palenius |
| 6,757,319 B1 | 6/2004 | Parsa et al. |
| 6,865,237 B1 | 3/2005 | Boariu et al. |
| 7,839,944 B2 | 11/2010 | Lee et al. |
| 7,941,186 B2 | 5/2011 | Cho et al. |
| 8,036,286 B2 | 10/2011 | Lee et al. |
| 8,068,555 B2 | 11/2011 | Jongren et al. |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

U.S. Appl. No. 12/723,647 Official Action dated Feb. 6, 2012.

(Continued)

*Primary Examiner* — Shuwang Liu
*Assistant Examiner* — Sung Ahn

(57) ABSTRACT

A method includes receiving a Multiple-Input Multiple Output (MIMO) signal over multiple communication channels from an antenna array including a first set of antennas having a first polarization and a second set of the antennas having a second polarization that is orthogonal to the first polarization. First feedback information is calculated relating to first interrelations between the antennas within either the first set or the second set. Second feedback information is calculated relating at least to second interrelations between the first set and the second set of the antennas. The first feedback information is transmitted at a first time/frequency granularity, and the second feedback information is transmitted at a second time/frequency granularity that is finer than the first time/frequency granularity.

20 Claims, 2 Drawing Sheets

(56) References Cited

U.S. PATENT DOCUMENTS

| | | | |
|---|---|---|---|
| 8,098,750 B2 | 1/2012 | Mueck et al. | |
| 8,179,775 B2 | 5/2012 | Chen et al. | |
| 8,325,844 B2 | 12/2012 | Walton et al. | |
| 8,515,435 B2 | 8/2013 | Krasny et al. | |
| 2002/0001333 A1 | 1/2002 | Glasheen et al. | |
| 2003/0035491 A1 | 2/2003 | Walton et al. | |
| 2005/0108281 A1 | 5/2005 | Kim et al. | |
| 2005/0141630 A1 | 6/2005 | Catreaux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2005/0276317 A1 | 12/2005 | Jeong et al. | |
| 2006/0014554 A1 | 1/2006 | Gerlach | |
| 2006/0056538 A1 | 3/2006 | Nam et al. | |
| 2006/0093060 A1 | 5/2006 | Jung et al. | |
| 2006/0114858 A1 | 6/2006 | Walton et al. | |
| 2006/0153112 A1 | 7/2006 | Lim et al. | |
| 2006/0203777 A1 | 9/2006 | Kim et al. | |
| 2006/0233131 A1 | 10/2006 | Gore et al. | |
| 2006/0276212 A1 | 12/2006 | Sampath et al. | |
| 2007/0058746 A1 | 3/2007 | Gueguen | |
| 2007/0076810 A1 | 4/2007 | Herrera et al. | |
| 2007/0099578 A1* | 5/2007 | Adeney et al. | 455/69 |
| 2007/0149229 A1 | 6/2007 | Frederiksen et al. | |
| 2007/0153731 A1 | 7/2007 | Fine | |
| 2007/0160162 A1 | 7/2007 | Kim et al. | |
| 2007/0165738 A1 | 7/2007 | Barriac et al. | |
| 2007/0217540 A1 | 9/2007 | Onggosanusi et al. | |
| 2007/0223422 A1 | 9/2007 | Kim et al. | |
| 2007/0223423 A1 | 9/2007 | Kim et al. | |
| 2007/0230373 A1 | 10/2007 | Li et al. | |
| 2007/0253386 A1 | 11/2007 | Li et al. | |
| 2007/0270170 A1 | 11/2007 | Yoon et al. | |
| 2008/0013610 A1* | 1/2008 | Varadarajan et al. | 375/221 |
| 2008/0025336 A1 | 1/2008 | Cho et al. | |
| 2008/0039067 A1 | 2/2008 | Jin et al. | |
| 2008/0049709 A1 | 2/2008 | Pan et al. | |
| 2008/0080364 A1 | 4/2008 | Barak et al. | |
| 2008/0080632 A1 | 4/2008 | Kim et al. | |
| 2008/0080634 A1 | 4/2008 | Kotecha et al. | |
| 2008/0080635 A1 | 4/2008 | Hugl et al. | |
| 2008/0080637 A1 | 4/2008 | Khan et al. | |
| 2008/0095258 A1 | 4/2008 | She et al. | |
| 2008/0101407 A1 | 5/2008 | Khan et al. | |
| 2008/0108310 A1 | 5/2008 | Tong et al. | |
| 2008/0112351 A1 | 5/2008 | Surinemi et al. | |
| 2008/0130778 A1 | 6/2008 | Xia et al. | |
| 2008/0144522 A1 | 6/2008 | Chang et al. | |
| 2008/0165875 A1 | 7/2008 | Mundarath et al. | |
| 2008/0186212 A1* | 8/2008 | Clerckx et al. | 341/55 |
| 2008/0192852 A1 | 8/2008 | Kent et al. | |
| 2008/0198776 A1 | 8/2008 | Seo | |
| 2008/0232494 A1 | 9/2008 | Pan et al. | |
| 2008/0232503 A1 | 9/2008 | Kim | |
| 2008/0247364 A1 | 10/2008 | Kim et al. | |
| 2008/0247475 A1 | 10/2008 | Kim et al. | |
| 2008/0268855 A1 | 10/2008 | Hanuni et al. | |
| 2008/0268887 A1 | 10/2008 | Jansen et al. | |
| 2008/0285433 A1 | 11/2008 | Akita et al. | |
| 2008/0292013 A1 | 11/2008 | Varadarajan et al. | |
| 2008/0298452 A1 | 12/2008 | Sampath et al. | |
| 2008/0298482 A1 | 12/2008 | Rensburg et al. | |
| 2008/0318606 A1 | 12/2008 | Tsutsui et al. | |
| 2009/0011761 A1 | 1/2009 | Han et al. | |
| 2009/0016263 A1 | 1/2009 | Kishigami et al. | |
| 2009/0046800 A1 | 2/2009 | Xu et al. | |
| 2009/0098876 A1 | 4/2009 | Khan et al. | |
| 2009/0110114 A1 | 4/2009 | Onggosanusi et al. | |
| 2009/0122857 A1 | 5/2009 | Li et al. | |
| 2009/0161605 A1 | 6/2009 | Shen et al. | |
| 2009/0180561 A1 | 7/2009 | Kim et al. | |
| 2009/0252333 A1 | 10/2009 | Chang et al. | |
| 2009/0282310 A1 | 11/2009 | Seok et al. | |
| 2009/0296844 A1 | 12/2009 | Ihm et al. | |
| 2009/0304109 A1 | 12/2009 | Kotecha | |
| 2010/0031117 A1 | 2/2010 | Lee et al. | |
| 2010/0034308 A1* | 2/2010 | Kim et al. | 375/267 |
| 2010/0035627 A1 | 2/2010 | Hou et al. | |
| 2010/0054354 A1 | 3/2010 | Tosato | |
| 2010/0056170 A1 | 3/2010 | Lindoff et al. | |
| 2010/0061477 A1 | 3/2010 | Lee et al. | |
| 2010/0067512 A1 | 3/2010 | Nam et al. | |
| 2010/0069106 A1 | 3/2010 | Swarts et al. | |
| 2010/0074301 A1 | 3/2010 | Howard et al. | |
| 2010/0103834 A1 | 4/2010 | Gorokhov et al. | |
| 2010/0113078 A1 | 5/2010 | Farajidana et al. | |
| 2010/0158151 A1* | 6/2010 | Krauss et al. | 375/267 |
| 2010/0172424 A1 | 7/2010 | Perets et al. | |
| 2010/0172430 A1 | 7/2010 | Melzer et al. | |
| 2010/0173639 A1 | 7/2010 | Li et al. | |
| 2010/0215112 A1* | 8/2010 | Tsai et al. | 375/267 |
| 2010/0220800 A1 | 9/2010 | Erell et al. | |
| 2010/0238984 A1 | 9/2010 | Sayana et al. | |
| 2010/0254474 A1 | 10/2010 | Gomadam et al. | |
| 2010/0260234 A1 | 10/2010 | Thomas et al. | |
| 2010/0260243 A1* | 10/2010 | Ihm et al. | 375/219 |
| 2010/0267341 A1 | 10/2010 | Bergel et al. | |
| 2010/0271968 A1 | 10/2010 | Liu et al. | |
| 2010/0272014 A1* | 10/2010 | Orlik et al. | 370/328 |
| 2010/0272032 A1 | 10/2010 | Sayana et al. | |
| 2010/0273514 A1 | 10/2010 | Koo et al. | |
| 2010/0278278 A1 | 11/2010 | Lee et al. | |
| 2010/0284484 A1* | 11/2010 | Jongren et al. | 375/267 |
| 2010/0290548 A1 | 11/2010 | Hoshino et al. | |
| 2010/0296603 A1 | 11/2010 | Lee et al. | |
| 2011/0019631 A1 | 1/2011 | Kotecha et al. | |
| 2011/0026413 A1 | 2/2011 | Swarts et al. | |
| 2011/0034175 A1 | 2/2011 | Fong et al. | |
| 2011/0058621 A1* | 3/2011 | Clerckx et al. | 375/267 |
| 2011/0064156 A1* | 3/2011 | Kim et al. | 375/267 |
| 2011/0077038 A1 | 3/2011 | Montojo et al. | |
| 2011/0080969 A1* | 4/2011 | Jongren et al. | 375/267 |
| 2011/0085610 A1* | 4/2011 | Zhuang et al. | 375/260 |
| 2011/0103534 A1 | 5/2011 | Axmon et al. | |
| 2011/0110403 A1 | 5/2011 | Jongren | |
| 2011/0134774 A1 | 6/2011 | Pelletier et al. | |
| 2011/0158190 A1 | 6/2011 | Kuwahara et al. | |
| 2011/0164701 A1 | 7/2011 | Nikopourdeilami et al. | |
| 2011/0170435 A1 | 7/2011 | Kim et al. | |
| 2011/0170638 A1* | 7/2011 | Yuan et al. | 375/340 |
| 2011/0176439 A1 | 7/2011 | Mondal et al. | |
| 2011/0188393 A1 | 8/2011 | Mallik et al. | |
| 2011/0194594 A1 | 8/2011 | Noh et al. | |
| 2011/0194644 A1 | 8/2011 | Liu et al. | |
| 2011/0205930 A1* | 8/2011 | Rahman et al. | 370/252 |
| 2011/0216846 A1* | 9/2011 | Lee et al. | 375/295 |
| 2011/0235608 A1 | 9/2011 | Koo et al. | |
| 2011/0250919 A1 | 10/2011 | Barbieri et al. | |
| 2011/0255483 A1 | 10/2011 | Xu et al. | |
| 2011/0261775 A1 | 10/2011 | Kim et al. | |
| 2011/0268204 A1 | 11/2011 | Choi et al. | |
| 2011/0274188 A1* | 11/2011 | Sayana et al. | 375/260 |
| 2011/0306341 A1 | 12/2011 | Klein et al. | |
| 2012/0002568 A1 | 1/2012 | Tiirola et al. | |
| 2012/0003926 A1 | 1/2012 | Coldrey et al. | |
| 2012/0020433 A1 | 1/2012 | Bhattad et al. | |
| 2012/0028628 A1 | 2/2012 | Frenger et al. | |
| 2012/0033592 A1 | 2/2012 | Kim et al. | |
| 2012/0033630 A1 | 2/2012 | Chung et al. | |
| 2012/0034927 A1 | 2/2012 | Papasakellariou et al. | |
| 2012/0039369 A1 | 2/2012 | Choi et al. | |
| 2012/0058735 A1 | 3/2012 | Vermani et al. | |
| 2012/0063336 A1 | 3/2012 | Shany et al. | |
| 2012/0069887 A1* | 3/2012 | Park et al. | 375/224 |
| 2012/0069917 A1 | 3/2012 | Liu et al. | |
| 2012/0076028 A1 | 3/2012 | Ko et al. | |
| 2012/0076038 A1 | 3/2012 | Shan et al. | |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0188976 A1 | 7/2012 | Kim et al. | |
| 2012/0218950 A1 | 8/2012 | Yu et al. | |
| 2012/0219042 A1 | 8/2012 | Onggosanusi et al. | |
| 2012/0219083 A1 | 8/2012 | Tong et al. | |

(56) References Cited

U.S. PATENT DOCUMENTS

| | | | |
|---|---|---|---|
| 2012/0236818 | A1 | 9/2012 | Kaminski et al. |
| 2012/0257664 | A1 | 10/2012 | Yue et al. |
| 2012/0275376 | A1 | 11/2012 | Sampath et al. |
| 2012/0275386 | A1 | 11/2012 | Frenne et al. |
| 2012/0281620 | A1 | 11/2012 | Sampath et al. |
| 2012/0329502 | A1 | 12/2012 | Frederiksen et al. |
| 2013/0028068 | A1 | 1/2013 | Park et al. |
| 2013/0028344 | A1 | 1/2013 | Chen et al. |
| 2013/0039284 | A1 | 2/2013 | Marinier et al. |
| 2013/0051256 | A1 | 2/2013 | Ong et al. |
| 2013/0077595 | A1 | 3/2013 | Aiba et al. |
| 2013/0107916 | A1 | 5/2013 | Liu et al. |
| 2013/0114427 | A1 | 5/2013 | Maattanen et al. |
| 2013/0114431 | A1 | 5/2013 | Koivisto |
| 2013/0128847 | A1 | 5/2013 | Wang et al. |
| 2013/0182786 | A1 | 7/2013 | Frenne et al. |
| 2013/0201840 | A1 | 8/2013 | Sorrentino et al. |
| 2013/0272221 | A1 | 10/2013 | Hoehne et al. |
| 2014/0029586 | A1 | 1/2014 | Loeher et al. |
| 2014/0051357 | A1 | 2/2014 | Steer et al. |

FOREIGN PATENT DOCUMENTS

| | | |
|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2009116471 A1 | 9/2009 |
| WO | 2010013950 A2 | 2/2010 |
| WO | 2011147692 A1 | 12/2011 |

OTHER PUBLICATIONS

U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for REL.10 DL MIMO", 3GPP TSG RAN # 62 Meeting, Madrid, Spain, Aug. 23-27, 2010.
Alcatel-Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec. 7-10, 2010.
Alcatel-Lucent et al., "Way Forward on CSI Feedback for Rel.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
Zte, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737, filed Jan. 10, 2012.
U.S. Appl. No. 13/433,293, filed Mar. 29, 2012.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT DOCOMO, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
3GPP TS 36.213 V9.0.1 (Dec. 2009); 3rd Generation Partnership Project, Technical Specification Group Radio Access Network, Evolved Universal Terrestrial Radio Access (E-UTRA); Physical layer procedures (Release 9); 2009; pp. 1-79; 3rd Generation Partnership Project (3GPP TM); Valbonne, France.
Precoding options for 8Tx antennas in LTE-A DL; 3GPP TSG RAN WG1 Meeting #55bis, R1-090388; Jan. 2009; pp. 1-6; Ljubljana, Slovenia.
Discussion on Enhanced DL Beamforming; 3GPP TSG RAN WG1 Meeting #56bis, R1-091229; Mar. 2009; pp. 1-6; Seoul, Korea.
Use of UL Covariance for Downlink MIMO in FDD; 3GPP ISO RAN1#5, R1-094690; Nov. 2009; pp. 1-5; Jeju, Korea.
On channel reciprocity for enhanced DL Multi-Antenna transmission; TSG-RAN WG1 #59, R1-094443; Nov. 2009; pp. 1-4; Jeju, Korea.
Codebook for 8Tx DL SU-MIMO for LTE-A; 3GPP TSG RAN1#59, R1-094686; Nov. 2009; pp. 1-4; Jeju, Korea.
Low-Overhead Feedback of Spatial Covariance Matrix; 3GPP TSG RAN1#59, R1-094844; Nov. 2009; pp. 1-7.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT DOCOMO, Inc., "Updated Views on Support of Wider Bandwidth in LTE-Advanced", 3GPP TSG RAN WG1 Meeting #54bis, Prague, Czech Republic, Sep. 29-Oct. 3, 2008.

(56) References Cited

OTHER PUBLICATIONS

3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, 17th-21st Nov. 2003.
Marvell Semiconductor, "Spatial Correlation based transmission schemes for LTE-A DL", 3GPP TSG RAN WG1 meeting #58, Shenzhen, China, Aug. 24-28, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Samsung, Comparisons and performance evaluation of differential feedback proposals for Rel 8 PMI enhancements, 3GPP TSG RAN WG1 Meeting #59bis, Valencia, Spain, Jan. 18-22, 2010.
Samsung, "Codebook Design for 8 Tx Transmission in LTE-A", 3GPP TSG Ran WG1 Meeting #56, Athens, Greece, Feb. 9-13, 2009.
International Application PCT/IB2009/052987 Search Report dated Jan. 27, 2010.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.
U.S. Appl. No. 13/023,555, filed Feb. 9, 2011.
U.S. Appl. No. 13/052,075, filed Mar. 20, 2011.
U.S. Appl. No. 61/321,386, filed Apr. 6, 2010.
U.S. Appl. No. 12/838,509, filed Jul. 19, 2010.
U.S. Appl. No. 61/294,737, filed Mar. 13, 2010.
U.S. Appl. No. 12/983,898, filed Jan. 4, 2011.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Marvell, "Codebook Adaptation for ULA Antenna", 3GPP TSG RAN WG1 Meeting #60, San Francisco, USA, Feb. 22-22, 2010.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT DOCOMO et al., "Prioritized Deployment Scenarios for LTE-Advanced Studies", 3GPP TSG RAN WG4 Meeting #50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.

(56) References Cited

OTHER PUBLICATIONS

Samsung, "UL Transmission Power Control in LTE-A", 3GPP TSG RAN WG1 Meeting #56bis, Seoul, Korea, Mar. 23-27, 2009 (R1-091250).
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced" 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).

Qualcomm Europe, Notion of Anchor Carrier in LTE-A', 3GPP TSG RAN WG1 Meeting #55-bis, Ljubljana, Slovenia, Jan. 12-16, 2009 (R1-080356).
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
Japanese Patent Application # 2011024295 Office Action dated Jan. 15, 2013.
U.S. Appl. No. 13/023,555 Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011-544111 Office Action dated Mar. 12, 2013.
U.S. Appl. No. 13/252,218 Office Action dated Apr. 11, 2013.
Zte, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.
JP Patent Application # 2011-551560 Office Action dated Oct. 29, 2013.
JP Patent Application # 2012-506601 Office Action dated Oct. 22, 2013.
U.S. Appl. No. 13/543,835 Office Action dated Nov. 22, 2013.
U.S. Appl. No. 13/669,476 Office Action dated Mar. 31, 2014.
U.S. Appl. No. 12/903,237 Office Action dated Feb. 27, 2014.
JP Application # 2012537460 Office Action dated Jan. 21, 2014.
NTT DoCoMo, 3GPP TSG RAN WG1, "Views on Scalable CSI Feedback for DL CoMP in LTE-Advanced", Meeting #58bis, R1-094243, pp. 1-5, Oct. 12-16, 2009.
NTT DoCoMo, 3GPP TSG RAN WG1, "Views on Single-Cell CSI Feedback Enhancement for DL MU-MIMO in LTE-Advanced", Meeting #58bis, R1-094241, pp. 1-6, Oct. 12-16, 2009.
U.S. Appl. No. 13/669,477 Official Action dated Apr. 14, 2014.
U.S. Appl. No. 13/610,904 Office Action dated May 1, 2014.

* cited by examiner

MIMO FEEDBACK SCHEMES FOR CROSS-POLARIZED ANTENNAS

CROSS-REFERENCE TO RELATED APPLICATIONS

This application claims the benefit of U.S. Provisional Patent Application 61/287,652, filed Dec. 17, 2009, and U.S. Provisional Patent Application 61/294,000, filed Jan. 11, 2010, whose disclosures are incorporated herein by reference in their entirety.

FIELD OF THE DISCLOSURE

The present disclosure relates generally to communication systems, and particularly to methods and systems for providing channel feedback in Multiple-Input Multiple-Output (MIMO) communication systems.

BACKGROUND

Various communication systems communicate using multiple transmit and/or receive antennas. Such communication schemes are referred to as Multiple-Input Multiple-Output (MIMO) schemes. MIMO configurations are used, for example, in Evolved Universal Terrestrial Radio Access (E-UTRA), also referred to as Long Term Evolution (LTE), and LTE-Advanced (LTE-A) systems. MIMO communication typically involves feeding back communication channel information from the receiver to the transmitter.

Various techniques for calculating and transmitting channel feedback are known in the art. For example, feedback schemes that are based on reciprocity between uplink and downlink channel are described in document R1-094443 of the Third generation Partnership Project (3GPP) Technical Specification Group (TSG) Radio Access Network (RAN), entitled "On Channel Reciprocity for Enhanced DL Multi-Antenna Transmission," Jeju, Korea, Nov. 9-13, 2009, which is incorporated herein by reference in its entirety. As another example, 3GPP TSG RAN document R1-094690, entitled "Use of UL Covariance for Downlink MIMO in FDD," Jeju, Korea, Nov. 9-13, 2009, which is incorporated herein by reference in its entirety, discusses the use of the uplink covariance matrix for downlink MIMO.

Some MIMO feedback schemes use precoding codebooks, i.e., predefined sets of precoding matrices. Codebook-based feedback schemes are described, for example, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.6.0, March, 2009, which is incorporated herein by reference in its entirety. Other codebook-based schemes are described in 3GPP TSG RAN document R1-94686, entitled "Codebook for 8Tx DL SU-MIMO for LTE-A," Jeju, Korea, Nov. 9-13, 2009, which is incorporated herein by reference in its entirety. Yet another example scheme is described in 3GPP TSG RAN document R1-903888, entitled "Precoding Options for 8Tx Antennas in LTE-A DL," Ljubljana, Slovenia, Jan. 12-16, 2009, which is incorporated herein by reference in its entirety.

Some MIMO feedback schemes are defined for cross-polarized antenna arrays. An example technique of this kind is described in 3GPP TSG RAN document R1-94844, entitled "Low Overhead Feedback of Spatial Covariance Matrix," Jeju, Korea, Nov. 9-13, 2009, which is incorporated herein by reference in its entirety. Another example is described in 3GPP TSG RAN document R1-91229, entitled "Discussion on Enhanced DL Beamforming," Seoul, Korea, Mar. 23-27, 2009, which is incorporated herein by reference in its entirety.

The description above is presented as a general overview of related art in this field and should not be construed as an admission that any of the information it contains constitutes prior art against the present patent application.

SUMMARY

An embodiment that is described herein provides a method, which includes receiving a Multiple-Input Multiple Output (MIMO) signal over multiple communication channels from an antenna array. The antenna array includes a first set of antennas having a first polarization and a second set of the antennas having a second polarization that is orthogonal to the first polarization. First feedback information is calculated relating to first interrelations between the antennas within either the first set or the second set. Second feedback information is calculated relating at least to second interrelations between the first set and the second set of the antennas. The first feedback information is transmitted at a first time/frequency granularity, and the second feedback information is transmitted at a second time/frequency granularity that is finer than the first time/frequency granularity.

In some embodiments, calculating the first and second feedback information includes calculating a feedback matrix, which is represented as a Kronecker product of a first matrix depending on the first interrelations and a second matrix depending on the second interrelations. In a disclosed embodiment, transmitting the first and second feedback information includes reporting the first matrix at the first time/frequency granularity and reporting the second matrix at the second time/frequency granularity. In an embodiment, calculating the feedback matrix includes estimating elements of a Spatial Correlation Function (SCF) matrix.

In another embodiment, calculating the feedback matrix includes selecting a precoding matrix to be applied for subsequent transmission of the MIMO signal. In an example embodiment, selecting the precoding matrix includes choosing the precoding matrix from a predefined set of precoding matrices, at least some of which are represented as Kronecker products of respective first matrices depending on the first interrelations and respective second matrices depending on the second interrelations.

In a disclosed embodiment, transmitting the first and second feedback information at the first and second time/frequency granularities includes transmitting only the second feedback information and not the first feedback information. In an embodiment, calculating the second feedback includes computing the second feedback based on at least one additional feedback parameter, which depends on one or more of the antennas in the first set and one or more of the antennas in the second set. In another embodiment, calculating the first feedback information includes computing the first feedback information over first time intervals and over first frequency bands, and calculating the second feedback information includes computing the second feedback information over second time intervals that are shorter than the first time intervals, and over second frequency bands that are narrower than the first frequency bands.

There is additionally provided, in accordance with an embodiment that is described herein, apparatus including a receiver, a processor and a transmitter. The receiver is configured to receive a MIMO signal over multiple communication channels from an antenna array including a first set of antennas having a first polarization and a second set of the antennas having a second polarization that is orthogonal to the first polarization. The processor is configured to calculate first feedback information relating to first interrelations between the antennas within either the first set or the second set, and to calculate second feedback information relating at least to second interrelations between the first set and the second set of the antennas. The transmitter is configured to transmit the first feedback information at a first time/frequency granularity, and to transmit the second feedback information at a second time/frequency granularity that is finer than the first time/frequency granularity.

In some embodiments, a mobile communication terminal includes the disclosed apparatus. In some embodiments, a chipset for processing signals in a mobile communication terminal includes the disclosed apparatus.

There is further provided, in accordance with an embodiment that is described herein, apparatus including an antenna array, a transmitter, a receiver and a processor. The antenna array includes a first set of antennas having a first polarization and a second set of the antennas having a second polarization that is orthogonal to the first polarization. The transmitter is configured to transmit a MIMO signal over multiple communication channels using the antenna array. The receiver is configured to receive, at a first time/frequency granularity, first feedback information relating to first interrelations between the antennas within either the first set or the second set, and to receive, at a second time/frequency granularity that is finer than the first time/frequency granularity, second feedback information relating at least to second interrelations between the first set and the second set of the antennas. The processor is configured to combine the first and second feedback information received respectively at the first and second time/frequency granularities, and to adapt transmission of the MIMO signal based on the combined first and second feedback.

The present disclosure will be more fully understood from the following detailed description of the embodiments thereof, taken together with the drawings in which:

DETAILED DESCRIPTION OF EMBODIMENTS

Figure 1:
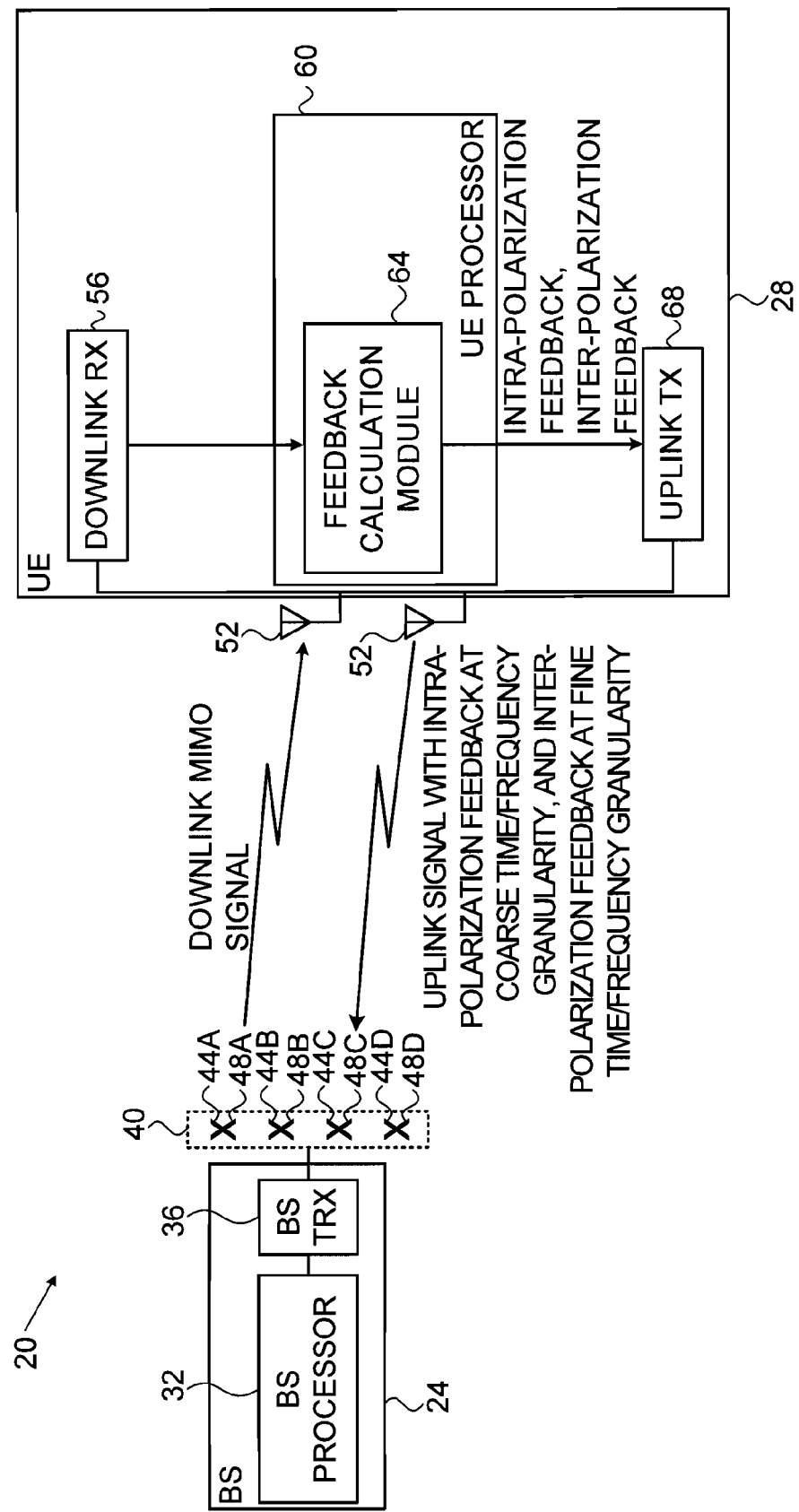
FIG. 1 is a block diagram that schematically illustrates a Multiple-Input Multiple-Output (MIMO) communication system, in accordance with an embodiment that is described herein.

Embodiments that are described herein provide improved methods and systems for providing channel feedback in MIMO communication systems. In some embodiments, a MIMO transmitter (e.g., a base station such as an LTE eNodeB) transmits a MIMO signal using a cross-polarized antenna array, i.e., an array comprising two sets of antennas having mutually-orthogonal polarizations. The antennas in the cross-polarized array are typically closely spaced, e.g., positioned at half wavelength ($\lambda/2$) intervals. A receiver (e.g., a mobile communication terminal) receives the MIMO signal, calculates feedback that is indicative of the communication channels corresponding to the different transmitter antennas, and sends the feedback to the transmitter. The transmitter controls subsequent MIMO transmission based on the feedback from the receiver.

When receiving signals that are transmitted from a cross-polarized antenna array, there is usually high correlation (over time and frequency) between communication channels corresponding to transmitter antennas having the same polarization, and low correlation between communication channels corresponding to antennas having the orthogonal polarizations.

The level of correlation between the communication channels corresponding to the different transmitter antennas typically determines the rate at which the BS antenna interrelations (e.g., correlation or covariance) vary over time and frequency. Highly-correlated communication channels typically correspond to slow variation of the interrelation over time/frequency, and vice versa. Thus, the interrelations between transmitter antennas having the same polarization typically vary slowly over time and frequency, whereas the interrelations between antennas having orthogonal polarizations typically vary more rapidly.

In some embodiments, the receiver uses the difference in correlation (and thus the difference in the rate of variation of the antenna interrelations) to reduce the volume of feedback information that is calculated and sent to the transmitter.

In some embodiments, the receiver calculates two types of feedback information. The first type of feedback information is based on interrelations between transmitter antennas having the same polarization. The second type of feedback information is based at least on interrelations between antennas having orthogonal polarizations. Since, as explained above, the first type of feedback is typically slowly-varying, in an embodiment the receiver sends the first type of feedback information at a relatively coarse time/frequency granularity. The second type of feedback usually varies rapidly, and therefore in an embodiment the receiver sends the second type of feedback information at a relatively fine time/frequency granularity. In some embodiments, the receiver adds to the second feedback type one or more additional feedback parameters, which do not necessarily depend on antennas having orthogonal polarizations but are nevertheless updated at fine granularity.

By partitioning the feedback information in this manner, and updating part of the feedback information at coarse time/frequency granularity, the receiver reduces the bandwidth that is used for feedback transmission. Therefore, the disclosed techniques improve the spectral efficiency of MIMO communication systems with little or no degradation in feedback quality. Moreover, since part of the feedback information may be calculated at coarse time/frequency granularity, the computational load in the receiver is reduced. Several example schemes for partitioning the feedback information are described below. Some schemes are based on Precoding Matrix Index (PMI) feedback, and other schemes are based on Spatial Correlation Function (SCF) feedback.

FIG. 1 is a block diagram that schematically illustrates a Multiple-Input Multiple-Output (MIMO) communication system 20, in accordance with an embodiment that is described herein. In the present example, system 20 comprises an E-UTRA (LTE) system that operates in accordance with the TS 36.213 specification, cited above. In alternative embodiments, however, system may operate in accordance with any other suitable communication standard or specification that uses MIMO signals, such as, for example, UMTS Terrestrial Radio Access (UTRA) systems (also sometimes referred to as Wideband Code Division Multiple Access—WCDMA) and WiMAX systems operating in accordance with IEEE 802.16 specifications.

System 20 comprises a Base Station (BS) (e.g., an LTE eNodeB), which communicates with a mobile communication terminal 28 (also referred to as User Equipment—UE). Although FIG. 1 shows only a single BS and a single UE for the sake of clarity, real-life communication systems typically comprise multiple BSs 24 and multiple UEs 28. BS 24 comprises a BS processor 32, which manages the operation of the BS. A BS transceiver (TRX) 36 generates downlink MIMO signals for transmission to UEs 28 and receives uplink signals from the UEs. BS 24 transmits downlink signals and receives uplink signals using a cross-polarized antenna array 40. Array 40 comprises a first set of antennas 44A . . . 44D having a certain polarization, and a second set of antennas 48A . . . 48D having a polarization that is orthogonal to the polarization of the first set.

In an example embodiment, one set of antennas is horizontally-polarized and the other set is vertically-polarized. In another example embodiment, one set of antennas has a +45° polarization and the other set has a −45° polarization. Alternatively, any other suitable orthogonal polarizations can be used.

In the present example, array 40 comprises a total of eight antennas, four antennas in each set. The antennas within each set are arranged in a Uniform Linear Array (ULA) configuration, in which the spacing between adjacent antennas is half wavelength ($\lambda/2$). Alternatively, however, the antenna array may comprise any suitable number of antennas having any suitable positions.

UE 28 comprises one or more antennas 52, which receive the MIMO downlink signals that are transmitted from BS 24, and transmit uplink signals to the BS. UE 28 comprises a downlink receiver (RX) 56 that receives and demodulates the downlink signals, an uplink transmitter (TX) 68 that generates and transmits the uplink signals, and a UE processor 60 that manages the UE operation and controls the various UE elements.

In some embodiments, UE processor 60 comprises a feedback calculation module 64, which calculates feedback information regarding the downlink communication channels between the BS antennas (44A . . . 44D and 48A . . . 48D) and UE antennas 52. Module 64 calculates the feedback information based on the downlink signals received by downlink receiver 56, e.g., based on reference signals or symbols that are transmitted as part of the downlink signals. Examples of reference signals comprise Common Reference Signals (CRS) in LTE systems, and Channel State Information Reference Signals (CSI-RS) in LTE-A systems. Alternatively, module 64 may calculate the feedback information based on any other suitable part of the received downlink signals.

Module 64 provides the calculated feedback information to uplink transmitter 68, and the uplink transmitter transmits the feedback information to BS 24. In some embodiments, feedback calculation module 64 calculates certain parts of the feedback information at fine time/frequency granularity and other parts of the feedback information at coarse time/frequency granularity, as will be explained below.

In BS 24, BS TRX 36 receives and demodulates the uplink signal, so as to extract the feedback information sent by UE 28. BS processor 32 uses the feedback information to control subsequent downlink transmissions. In an example embodiment, the BS processor sets the downlink precoding scheme (the relative signal phases and amplitudes in the different antennas of array 40) based on the feedback information. Alternatively, the BS processor may use the feedback information to control the downlink transmissions in any other way, such as in making scheduling or channel assignment decisions.

Typically, the channel feedback information that is calculated by module 64 in UE 28 is indicative of interrelations between the BS antennas. In some embodiments, the feedback information is based on correlations or covariances between pairs of BS antennas. In other embodiments, the feedback is based on phase or amplitude relationships between sets of antennas, e.g., between antennas 44A . . . 44D and antennas 48A . . . 48D.

The term "interrelations between antennas" is used to describe any kind of relationship between the communication channels corresponding to the BS antennas, either between pairs of the antennas or between entire sets of antennas (e.g., between the set having one polarization and the set having the orthogonal polarization), or between the signals that are received from these antennas. Interrelations may comprise, for example, correlation, covariance, average phase and/or amplitude offset, and/or any other suitable quantity.

Typically, there exists high correlation (over time and frequency) between the communication channels of BS antennas having the same polarization, and low correlation between the communication channels of BS antennas having the orthogonal polarizations. In system 20, for example, the communication channels corresponding to antennas 44A . . . 44D are typically highly-correlated with one another, the communication channels corresponding to antennas 48A . . . 48D are typically highly-correlated with one another, but communication channels corresponding to antennas that do not belong to the same antenna set typically have low correlation.

The level of correlation between the communication channels of the different BS antennas typically determines the rate at which the BS antenna interrelations (e.g., correlation or covariance) vary over time and frequency. Highly-correlated communication channels typically correspond to slow variation of the interrelation over time/frequency, and vice versa. Thus, the interrelations between BS antennas having the same polarization typically vary slowly over time and frequency, whereas the interrelations between BS antennas having orthogonal polarizations typically vary more rapidly.

In some embodiments, feedback calculation module 64 calculates two types of feedback information. The first type of feedback information is based on interrelations between antennas having the same polarization (e.g., interrelations among antenna set 44A . . . 44D or interrelations among antenna set 48A . . . 48D). The second type of feedback information is based at least on interrelations between antennas having orthogonal polarizations (e.g., interrelations between set 44A . . . 44D and set 48A . . . 48D).

The first type of feedback information is typically slowly-varying over time and frequency, and therefore in an embodiment module 64 is configured to calculate this feedback information at a relatively coarse time/frequency granularity. The second type of feedback information typically varies more rapidly over time and frequency, and therefore in an embodiment module 64 is configured to calculate this feedback information at finer time/frequency granularity than the granularity used for the first type.

In the present context, the term "time granularity" refers to the characteristic time duration between successive updates of the feedback information. Thus, calculating the feedback information at fine time granularity means updating the feedback information at frequent intervals, and vice versa. The term "frequency granularity" refers to the characteristic bandwidth over which the feedback information is averaged or otherwise calculated. Thus, calculating the feedback information at fine frequency granularity means computing the feedback information for a large number of narrow sub-bands, and vice versa.

In the description that follows, the feedback information that is based on interrelations between antennas having the same polarization is referred to as "intra-polarization feedback," and is sometimes denoted "ULA." The feedback information that is based on interrelations between antennas having orthogonal polarizations is referred to as "inter-polarization feedback," and is sometimes denoted "POL."

In an example embodiment, the inter-polarization feedback is averaged separately in the frequency domain over each of several spectral sub-bands, and averaged and transmitted in the time domain at intervals of several milliseconds. In an LTE system, for example, a sub-band may comprise several LTE Resource Blocks (RBs). The intra-polarization feedback, on the other hand, is averaged in the frequency domain over the entire operating bandwidth of system 20, averaged in the time domain over a fraction of a second and transmitted at a rate of several times per second, or even once every several seconds. Alternatively, any other suitable time and frequency granularities can be used. Calculating and transmitting the intra-polarization feedback at coarse time/frequency granularity enables considerable reduction in feedback bandwidth and in the computational load on the UE processor.

In some embodiments, module 64 calculates and feeds back only the inter-polarization feedback and not the intra-polarization feedback. In an example embodiment, the BS estimates the intra-polarization feedback from uplink signal measurements, assuming that the uplink and downlink channels are at least partially reciprocal.

The BS and UE configurations shown in FIG. 1 are example configurations, which are depicted solely for the sake of clarity. In alternative embodiments, any other suitable BS and UE configurations can also be used. Some UE and BS elements that are not mandatory for understanding of the disclosed techniques have been omitted from the figures for the sake of clarity. The different elements of these units are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some elements may be implemented using software executing on programmable hardware, or using a combination of hardware and software elements.

In some embodiments, some or all of the elements of UE 28 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
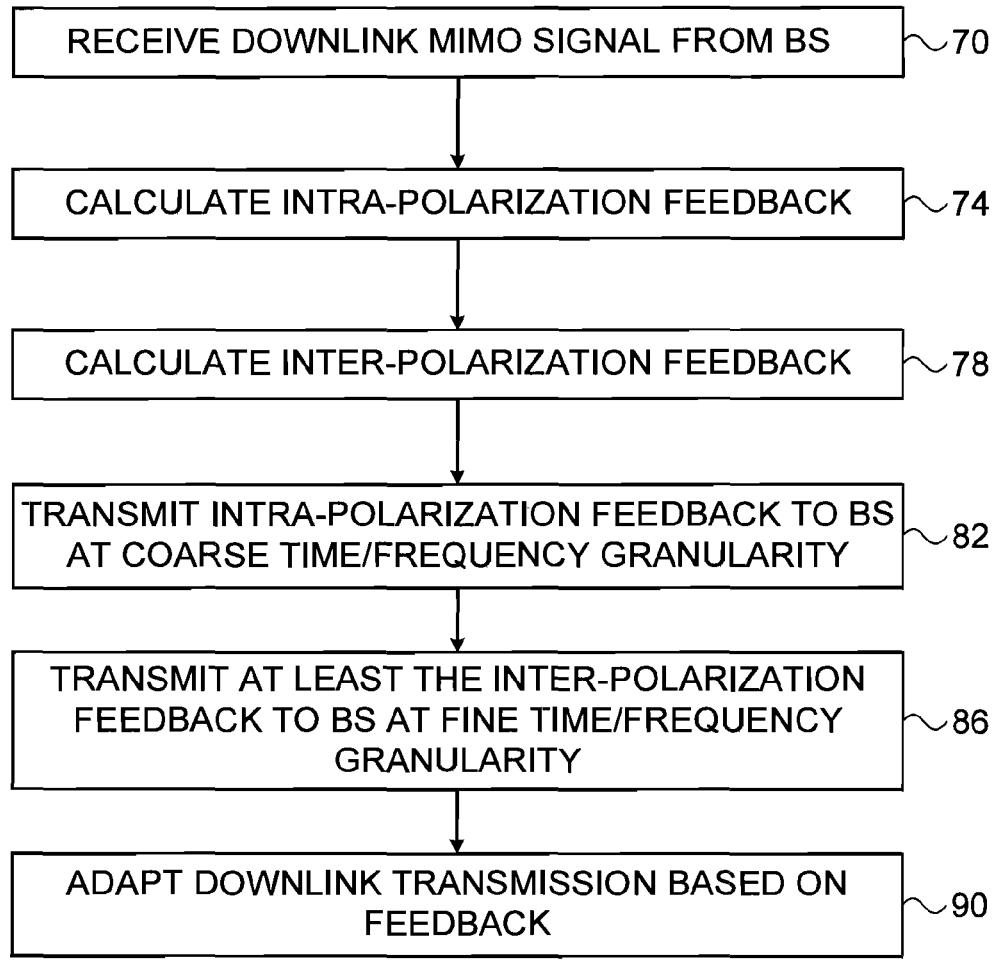
FIG. 2 is a flow chart that schematically illustrates a method for providing channel feedback in a MIMO communication system, in accordance with an embodiment that is described herein.

FIG. 2 is a flow chart that schematically illustrates a method for providing channel feedback in a MIMO communication system, in accordance with an embodiment that is described herein. The method begins at a downlink reception operation 70, with downlink receiver 56 of UE 28 receiving downlink MIMO signals from BS 24. Feedback calculation module 64 in UE processor 60 then calculates feedback information based on the received MIMO signal.

Module 64 calculates the intra-polarization feedback, i.e., the feedback information that is based on interrelations between antennas having the same polarization, at an intra-polarization calculation operation 74. Module 64 calculates the inter-polarization feedback, i.e., the feedback information that is based on interrelations between antennas having orthogonal polarizations, at an inter-polarization calculation operation 78. In some embodiments, the calculation of intra-polarization feedback is performed at coarser time/frequency granularity than the calculation of inter-polarization feedback.

In an embodiment, uplink transmitter 68 of UE 28 transmits the intra-polarization feedback to BS 24, at an intra-polarization feedback transmission operation 82, and transmits at least the inter-polarization feedback at an inter-polarization feedback transmission operation 86. The transmission of intra-polarization feedback is typically performed at coarser time/frequency granularity than the transmission of inter-polarization feedback. BS 24 adapts subsequent downlink transmissions based on the feedback received from UE 28, at an adaptation operation 90. In an example embodiment, BS processor 32 of BS 24 sets the precoding scheme in subsequent downlink transmissions to the UE based on the feedback.

In various embodiments, system 20 uses various kinds of channel feedback between UE 28 and BS 24. Some feedback schemes are explicit, i.e., report the actual estimated channel parameters, sometimes in some compressed form. An example of an explicit feedback scheme is Spatial Correlation Function (SCF) feedback, in which the UE estimates and reports elements of the SCF matrix. In an example embodiment, the UE reports one or more of the matrix eigenvalues and/or eigenvectors. Other feedback schemes are implicit. In a typical implicit feedback scheme, the BS and UE use a predefined set of precoding matrices, referred to as a codebook, and the UE reports an index (Precoding Matrix Index—PMI) of a preferred precoding matrix selected from the codebook.

The disclosed techniques can be used with any suitable feedback scheme, such as with the above-described explicit and implicit schemes. The description that follows gives several examples of how module 64 in UE 28 partitions the feedback information into a slowly-varying part that is reported at coarse time/frequency granularity and a rapidly-varying part that is reported at fine time/frequency granularity.

Consider an example system in which the BS transmits using a cross-polarized antenna array having four transmit antennas denoted A1 . . . A4, and the UE uses a single receive antenna. Antennas A1 and A2 have a certain polarization, and antennas A3 and A4 have a certain polarization that is orthogonal to the polarization of antennas A1 and A2. In SCF feedback schemes, the SCF matrix R is defined as the expected value of the matrix $H^H H$, wherein H denotes the channel matrix. The SCF matrix is thus given by $$R = \left\langle \begin{bmatrix} h_1^* h_1 & h_1^* h_2 & h_1^* h_3 & h_1^* h_4 \\ h_2^* h_1 & h_2^* h_2 & h_2^* h_3 & h_2^* h_4 \\ h_3^* h_1 & h_3^* h_2 & h_3^* h_3 & h_3^* h_4 \\ h_4^* h_1 & h_4^* h_2 & h_4^* h_3 & h_4^* h_4 \end{bmatrix} \right\rangle \quad \text{Equation 1}$$

wherein the $\langle \rangle$ operator denotes expectation over a certain time/frequency range, and $h_i$ denotes the propagation channel corresponding to the signal transmitted from antenna Ai. (With a larger number of receive antennas, the expectation can be viewed as including some averaging over the receive antennas.) Although the description that follows refers to expectations in calculating the feedback information, the disclosed techniques can be used with any other suitable type of averaging.

The channel matrix H is typically estimated in the UE based on received reference signals, as explained above. The assumption here is that reference signals are transmitted via all transmit antennas, and that the reference signals transmitted via different transmit antennas are orthogonal.

In an embodiment, the SCF matrix R is modeled as the following Kronecker product (also known as a direct product or a tensor product):

$$R \approx R_{POL} \otimes R_{ULA} \qquad \text{Equation 2}$$

wherein matrix $R_{POL}$ has only inter-polarization elements and matrix $R_{ULA}$ has only intra-polarization elements. In other words, each element of $R_{POL}$ depends only on antennas having different polarizations, and each element of $R_{ULA}$ depends only on antennas having the same polarization. This modeling is described, for example, in 3GPP TSG RAN document R1-94844, cited above.

(Given an m-by-n matrix X and a p-by-q matrix Y, the Kronecker product of these matrices, denoted $C = X \otimes Y$, is an m·p-by-n·q matrix whose elements are defined by $c_{\alpha\beta} = x_{ij} y_{kl}$, wherein $x_{ij}$ and $y_{kl}$ denote the elements of X and Y, respectively, $\alpha = p(i-1)+k$ and $\beta = q(j-1)+l$.)

Using the Kronecker model, the SCF matrix R can be represented using five parameters denoted $\alpha$, $\beta$, $\rho$, $\eta$ and $\delta$:

$$R \approx R_{POL} \otimes R_{ULA} = \delta \begin{bmatrix} 1 & \beta & \eta & \eta\beta \\ \beta^* & \alpha & \eta\beta^* & \alpha\eta \\ \eta^* & \eta^*\beta & \rho & \rho\beta \\ \eta^*\beta^* & \alpha\eta^* & \rho\beta^* & \alpha\rho \end{bmatrix} \qquad \text{Equation 3}$$

wherein $R_{POL}$ and $R_{ULA}$ are given by:

$$R_{ULA} = \begin{bmatrix} 1 & \beta \\ \beta^* & \alpha \end{bmatrix}, R_{POL} = \begin{bmatrix} 1 & \eta \\ \eta^* & \rho \end{bmatrix}. \qquad \text{Equation 4}$$

Module 64 typically estimates these five parameters and then reports them as feedback information to BS 24 using uplink transmitter 68. Module 64 can estimate the five parameters $\alpha$, $\beta$, $\rho$, $\eta$ and $\delta$ in various ways. In an example embodiment, module 64 evaluates the following expectations over time and frequency:

$$\alpha = \langle h_2^* h_2 + h_4^* h_4 \rangle / \langle h_1^* h_1 + h_3^* h_3 \rangle \qquad \text{Equation 5}$$

$$\beta = \langle h_1^* h_2 + h_3^* h_4 \rangle / \langle h_1^* h_1 + h_3^* h_3 \rangle$$

$$\rho = \frac{\left\langle h_3^* h_3 + h_4^* h_4 + \frac{h_4^* h_3 + h_3^* h_4}{2} \right\rangle}{\left\langle h_1^* h_1 + h_2^* h_2 + \frac{h_2^* h_1 + h_1^* h_2}{2} \right\rangle}$$

$$\eta = \frac{\left\langle h_1^* h_3 + h_2^* h_4 + \frac{h_2^* h_3 + h_1^* h_4}{2} \right\rangle}{\left\langle h_1^* h_1 + h_2^* h_2 + \frac{h_2^* h_1 + h_1^* h_2}{2} \right\rangle}$$

$$\delta = \frac{\langle h_1^* h_1 + h_2^* h_2 + h_3^* h_3 + h_4^* h_4 \rangle}{(1+\alpha)(1+\rho)}$$

In order to calculate the inter-polarization and intra-polarization feedback at different time/frequency granularities, module 64 evaluates the expectations in Equation 5 above over different time/frequency ranges. In an embodiment, module 64 evaluates the expectations in $\alpha$ and $\beta$ over larger bandwidth and/or longer time, and the expectations in $\rho$, $\eta$ and $\delta$ over smaller bandwidth and/or shorter time. Then, the estimated parameters $\alpha$, $\beta$, $\rho$, $\eta$ and $\delta$ are fed back using transmitter 68 at time/frequency granularities that match the bandwidths and time intervals over which they were evaluated.

Let the time and frequency granularities for the intra-polarization (ULA) feedback be denoted T1 and BW1, respectively. Let the time and frequency granularities for the inter-polarization (POL) feedback be denoted T2 and BW2, respectively. Using this notation, Equation 5 can be written as:

$$\alpha, \beta = \langle \rangle_{T1,BW1} / \langle \rangle_{T1,BW1}$$

$$\rho, \eta = \langle \rangle_{T2,BW2} / \langle \rangle_{T2,BW2}$$

$$\delta = \langle \rangle_{T2,BW2} \qquad \text{Equation 6}$$

wherein the expectations in Equation 6 are evaluated over the corresponding terms in Equation 5 above.

Note that the normalization factor $\delta$ is related to the overall signal power, which often varies strongly with frequency and time. Therefore, although this normalization factor does not contain inter-polarization terms, it is added to the feedback information that is calculated and fed back at fine time/frequency granularity. Note also that $\delta$ does not affect the precoding, and therefore it is not regarded as part of the precoding-related feedback.

The above parameterization and parameter estimation example refers to a configuration of four transmit antennas. In alternative embodiments, this technique can be generalized in a straightforward manner to any other suitable number of transmit antennas, such as the eight antenna configuration of FIG. 1 above.

For eight receive antennas, the intra-polarization feedback (ULA) is described by three real and six complex values. The inter-polarization feedback (POL), excluding $\delta$, is described by only a single real value ($\rho$) and a single complex value ($\eta$). If, for example, T1 is a hundred times longer than T2 and BW1 is ten times wider than BW2, the intra-polarization feedback is reduced by a factor of 1000, and the total feedback overhead is reduced from eighteen to three real values per T2 interval and BW2-wide frequency sub-band.

In alternative embodiments, e.g., when using more than two transmit antennas, module 64 may describe $R_{ULA}$ using any other suitable parameterization scheme. Example schemes are described in 3GPP TSG RAN document R1-94844, cited above.

The following description explains yet another example of a parameterization and estimation scheme that can be used by module 64 for calculating the inter-polarization and intra-polarization feedback in a SCF-based feedback scheme. Without loss of generality, Equation 2 above can be written as:

$$R_{ULA} = \begin{bmatrix} a_1 & \alpha\sqrt{a_1 a_2} \\ \alpha^*\sqrt{a_1 a_2} & a_2 \end{bmatrix} \qquad \text{Equation 7}$$

$$R_{POL} = \begin{bmatrix} b_1 & \beta\sqrt{b_1 b_2} \\ \beta^*\sqrt{b_1 b_2} & b_2 \end{bmatrix}$$

Each of the covariance matrices in Equation 7 can be written as the product of its correlation matrix and the corresponding magnitude matrix:

$$R_{ULA} = M_{ULA}^{0.5} C_{ULA} M_{ULA}^{0.5}$$

$$R_{POL} = M_{POL}^{0.5} C_{POL} M_{POL}^{0.5} \qquad \text{Equation 8}$$

The correlation matrices are of the form:

$$C_{ULA} = \begin{bmatrix} 1 & \alpha \\ \alpha^* & 1 \end{bmatrix} \quad \text{Equation 9}$$

$$C_{POL} = \begin{bmatrix} 1 & \beta \\ \beta^* & 1 \end{bmatrix}$$

wherein $|\alpha|, |\beta| \leq 1$. The corresponding magnitude matrices are given by:

$$M_{ULA} = (a_1 + a_2) \begin{bmatrix} \frac{a_1}{a_1 + a_2} & 0 \\ 0 & 1 - \frac{a_1}{a_1 + a_2} \end{bmatrix} \quad \text{Equation 10}$$

$$M_{POL} = (b_1 + b_2) \begin{bmatrix} \frac{b_1}{b_1 + b_2} & 0 \\ 0 & 1 - \frac{b_1}{b_1 + b_2} \end{bmatrix}$$

Substituting the above matrices into the expression for the covariance matrix R gives:

$$R = \mu M^{0.5} C M^{0.5} \quad \text{Equation 11}$$

wherein $\mu$ denotes a scalar parameter of the estimator, and C and M are given by:

$$C = C_{Pol} \otimes C_{ULA} \quad \text{Equation 12}$$

$$M = \begin{bmatrix} x & 0 \\ 0 & 1-x \end{bmatrix} \otimes \begin{bmatrix} y & 0 \\ 0 & 1-y \end{bmatrix}, x, y \leq 1$$

In this embodiment, module 64 estimates and feeds back parameters $\mu$, x, y, $\alpha$ and $\beta$. In an example embodiment, module 64 estimates an empirical (measured) covariance matrix denoted $R_{emp}$. Module 64 decomposes this matrix into a normalized correlated form:

$$R_{emp} = \text{trace}(R_{emp}) M_{emp}^{0.5} C_{emp} M_{emp}^{0.5} \quad \text{Equation 13}$$

wherein $M_{emp} = \text{diag}(m_1, m_2, m_3, m_4)$, $m_k \leq 1$, and $C_{emp} = \{c_{ij}\}$.

In some embodiments, module 64 estimates parameters $\mu$, x, y, $\alpha$ and $\beta$ by numerically solving the expression:

$$(\mu, x, y, \alpha, \beta)^{OPT} = \arg\min \|R(\mu, x, y, \alpha, \beta) - R_{emp}\|_F \quad \text{Equation 14}$$

Module 64 may apply any suitable numerical method for this purpose, such as various gradient descent and fixed-point iteration methods.

In an alternative embodiment, module 64 exploits the normalized decomposition of the covariance matrix into a correlation component and a magnitude component to simplify the parameter estimation. In this embodiment, the optimization problem is given by:

$$(\alpha, \beta) = \arg\min |c_{12} - \beta|^2 + |c_{13} - \alpha|^2 + \quad \text{Equation 15}$$
$$|c_{14} - \alpha\beta|^2 + |c_{23} - \alpha\beta^*|^2 + |c_{24} - \alpha|^2 + |c_{34} - \beta|^2.$$

$$(x, y) = \arg\min |m_1 - xy|^2 + |m_2 - x(1-y)|^2 +$$
$$|m_3 - (1-x)y|^2 + |m_4 - (1-x)(1-y)|^2.$$

$$\mu = \text{trace}(R_{emp})$$

In yet another embodiment, module 64 estimates parameters $\mu$, x, y, $\alpha$ and $\beta$ by evaluating:

$$\mu = \text{trace}(R_{emp}) \quad \text{Equation 16}$$

$$\beta = \frac{c_{12} + c_{34}}{2}$$

$$\alpha = \frac{c_{13} + c_{24}}{2}$$

$$x = m_1 + m_2$$

$$y = m_1 + m_3$$

The latter scheme involves only simple computations such as addition and multiplication, which simplifies implementation in UE 28. This scheme is also computationally robust since it does not involve nonlinearities.

In an embodiment, upon receiving the above-described feedback in BS 24, BS processor 32 reconstructs the covariance matrix R by evaluating:

$$R_{POL} = \mu \begin{bmatrix} \sqrt{x} & 0 \\ 0 & \sqrt{1-x} \end{bmatrix} \begin{bmatrix} 1 & \beta \\ \beta^* & 1 \end{bmatrix} \begin{bmatrix} \sqrt{x} & 0 \\ 0 & \sqrt{1-x} \end{bmatrix} \quad \text{Equation 17}$$

$$R_{ULA} = \begin{bmatrix} \sqrt{y} & 0 \\ 0 & \sqrt{1-y} \end{bmatrix} \begin{bmatrix} 1 & \alpha \\ \alpha^* & 1 \end{bmatrix} \begin{bmatrix} \sqrt{y} & 0 \\ 0 & \sqrt{1-y} \end{bmatrix}$$

In some embodiments, system 20 uses implicit, PMI-based feedback. In these embodiments, BS 24 and UE 28 use a predefined codebook of precoding matrices. Each precoding matrix in the codebook has a corresponding index, and the UE feedback comprises an index of the preferred precoding matrix (PMI). In order to partition the feedback into an intra-polarization part and an inter-polarization part, in some embodiments the codebook is represented as a Kronecker product of two sub-codebooks. In these embodiments, the precoding matrices in the codebook are constrained to have the form:

$$V \equiv V_{Pol} \otimes V_{ULA} \quad \text{Equation 18}$$

wherein $V_{POL}$ denotes a precoding matrix corresponding to pairs of antennas in which the antennas in each pair have orthogonal polarizations, and $V_{ULA}$ denotes a precoding matrix corresponding to pairs of antennas in which both antennas in each pair have the same polarization.

Certain aspects of precoding codebooks that are constructed using Kronecker products are also addressed in U.S. patent application Ser. No. 12/652,044, which is assigned to the assignee of the present patent application and whose disclosure is incorporated herein by reference in its entirety, and in 3GPP TSG RAN documents R1-94686 and R1-903888, cited above.

Typically, module 64 calculates $V_{POL}$, and transmitter 68 feeds back $V_{POL}$, at a relatively fine time/frequency granularity (e.g., T2/BW2). On the other hand, module 64 calculates $V_{ULA}$, and transmitter 68 feeds back $V_{ULA}$, at a relatively coarse time/frequency granularity (e.g., T1/BW1). Upon receiving a certain $V_{POL}$ feedback at BS 24, the equality in Equation 18 holds assuming $V_{ULA}$ has already been chosen.

Module 64 may choose the preferred $V_{ULA}$ matrix using any suitable method. In an example embodiment, module 64 conducts an exhaustive search for the optimal $V_{ULA}$. Consider, for example, a scenario in which T1=T2 and BW1>>BW2. In an embodiment, module 64 evaluates all possible $V_{ULA}$ matrices and chooses the preferred matrix without introducing delay. When T1>>T2, module 64 can maintain the first $V_{ULA}$ matrix that was chosen by the exhaustive search on the first T2 interval within T1.

In an alternative embodiment, module 64 searches at a given time and frequency instant both for the preferred $V_{POL}$ matrix (under the constraint of a previously-chosen $V_{ULA}$ matrix), and for an optimal $V_{POL}/V_{ULA}$ matrix pair. The current $V_{POL}$ feedback comprises the former (preferred $V_{POL}$ assuming a previously-chosen $V_{ULA}$), but the chosen $V_{ULA}$ indices from the latter (optimal $V_{POL}/V_{ULA}$ pair) is stored in memory. When an update of $V_{ULA}$ is carried out, the update is determined by performing a majority vote between the indices stored in memory.

In another alternative embodiment, module 64 estimates $R_{ULA}$ as described in Equation 4 above, and then determines $V_{ULA}$ using Singular Value Decomposition (SVD). This technique is useful, for example, in scenarios where BS 24 assumes reciprocity between the uplink and downlink channels for inter-polarization precoding, so that $V_{ULA}$ does not have to be quantized. If $V_{ULA}$ does need to be quantized for feedback, quantization according to any suitable metric, e.g., Chordal distance, can be used.

The description above refers to codebooks in which all precoding matrices are structured according to the form of Equation 18. In alternative embodiment, only a subset of the precoding matrices in the codebook are structures in this form, and one or more of the precoding matrices in the codebook are free of this constraint.

In some embodiments, system 20 uses eigenvalue/eigenvector-based feedback. In these embodiments, module 64 in UE 28 calculates and feeds back one or more eigenvalues and/or eigenvectors of the channel covariance matrix R. Matrix R can be written as:

$$R = VDV^H \qquad \text{Equation 19}$$

wherein V and D denote eigen-matrices, such that V is unitary and D is diagonal. Matrices V and D can be represented using Kronecker products of inter-polarization and intra-polarization matrices:

$$V = V_{Pol} \otimes V_{ULA}$$

$$D = D_{Pol} \otimes D_{ULA} \qquad \text{Equation 20}$$

In an embodiment, module 64 chooses and feeds back the optimal $V_{ULA}$ at a relatively coarse time/frequency granularity, and selects and feeds back $V_{POL}$ at a relatively fine time/frequency granularity under the constraint that $V_{ULA}$ has already been selected. If the eigenvalue-based feedback is quantized by a codebook, then, similar to the PMI-based embodiments, this codebook should have the structure of Equation 12 above.

Module 64 may parameterize and report the inter-polarization and intra-polarization parts of V and D in any suitable way. The following description gives an example parameterization and estimation scheme. In a cross-polarized antenna array of 2N transmit antennas, the V and D matrices associated with the inter-polarization (POL) feedback are 2-by-2 matrices, whereas the V and D matrices associated with the intra-polarization (ULA) feedback are N-by-N matrices. Thus, for four transmit antennas, all the V and D matrices are 2-by-2 matrices, and therefore the unitary V and the diagonal D matrices can generally be represented as:

$$V_{2\times 2} = \begin{bmatrix} \cos\frac{\vartheta}{2} & \sin\frac{\vartheta}{2} \\ e^{-j\varphi}\sin\frac{\vartheta}{2} & -e^{-j\varphi}\cos\frac{\vartheta}{2} \end{bmatrix} \qquad \text{Equation 21}$$

$$D_{2\times 2} = \mu \begin{bmatrix} 1+\varepsilon & 0 \\ 0 & 1-\varepsilon \end{bmatrix}$$

wherein $0 \leq \theta \leq \pi$, $0 \leq \epsilon \leq 1$, and assuming the convention that the first column of matrix V corresponds to the stronger eigenvector (i.e., the eigenvector having the larger eigenvalue). The general form for either $R_{POL}$ or $R_{ULA}$ becomes:

$$R_{2\times 2} = \mu \begin{bmatrix} 1+\varepsilon\cos\vartheta & e^{j\varphi}\varepsilon\sin\vartheta \\ e^{-j\varphi}\varepsilon\sin\vartheta & 1-\varepsilon\cos\vartheta \end{bmatrix} \qquad \text{Equation 22}$$

Using Equation 21 above, the ULA and POL eigen-matrices can be written explicitly as:

$$V_{ULA} = \begin{bmatrix} \cos\alpha & \sin\alpha \\ e^{-j\beta}\sin\alpha & -e^{-j\beta}\cos\alpha \end{bmatrix} \qquad \text{Equation 23}$$

$$V_{Pol} = \begin{bmatrix} \cos\gamma & \sin\gamma \\ e^{-j\eta}\sin\gamma & -e^{-j\eta}\cos\gamma \end{bmatrix}$$

$$D_{ULA} = \begin{bmatrix} 1+\varepsilon & 0 \\ 0 & 1-\varepsilon \end{bmatrix}$$

$$D_{Pol} = \mu \begin{bmatrix} 1+\nu & 0 \\ 0 & 1-\nu \end{bmatrix}$$

wherein $0 \leq \alpha \leq \pi/2$, $0 \leq \gamma \leq \pi/2$, and whereing the total normalization factor $\mu$ is embedded in $D_{Pol}$.

The eigenvalue representation of R can thus be written as:

$$D = D_{Pol} \otimes D_{ULA} = \mu \begin{bmatrix} (1+\varepsilon)(1+\nu) & & & 0 \\ & (1-\varepsilon)(1+\nu) & & \\ & & (1+\varepsilon)(1-\nu) & \\ 0 & & & (1-\varepsilon)(1-\nu) \end{bmatrix} \qquad \text{Equation 24}$$

whereing Trace(D)=$4\mu$, and where $(1+\epsilon)\cdot(1+\nu)$ denotes the largest eigenvalue. The eigenvector matrix is given by:

$$V = V_{Pol} \otimes V_{ULA} = \begin{bmatrix} 1 & & & 0 \\ & e^{-j\beta} & & \\ & & e^{-j\eta} & \\ 0 & & & e^{-j(\beta+\eta)} \end{bmatrix} \quad \text{Equation 24}$$

$$\begin{bmatrix} A & E & C & B \\ E & -A & B & -C \\ C & B & -A & -E \\ B & -C & -E & A \end{bmatrix} = e^{-j\Phi}\Psi$$

wherein A, B, C, E are real positive values and $\Phi$ is a 2-by-2 matrix whose left-most column refers to the strongest eigenvector:

$A = \cos\alpha\cos\gamma \; \Phi_{11} = 0$ $B = \sin\alpha\sin\gamma \; \Phi_{22} = \beta$ $C = \cos\alpha\sin\gamma \; \Phi_{33} = \eta$ $E = \sin\alpha\cos\gamma \; \Phi_{44} = \beta + \eta$ \quad Equation 25

Note that $\epsilon$ and $\nu$ are defined to be positive, and therefore the largest eigenvalue in Equation 24 is the top-left eigenvalue. The strongest eigenvector, denoted $V_1$, is thus given by:

$$V_1 = \begin{bmatrix} \cos\alpha\cos\gamma \\ e^{-j\beta}\sin\alpha\cos\gamma \\ e^{-j\eta}\cos\alpha\sin\gamma \\ e^{-j(\beta+\eta)}\sin\alpha\sin\gamma \end{bmatrix} = e^{-j\Phi}\Psi_1 \quad \text{Equation 26}$$

wherein $\Psi_1$ is the first column of $\Psi$.

The diagonal of matrix R is given by:

$$\text{diag}R = \text{diag}(R_{Pol} \otimes R_{ULA}) = \mu \begin{bmatrix} 1 + \epsilon\cos(2\alpha))(1 + \nu\cos(2\gamma)) \\ 1 - \epsilon\cos(2\alpha))(1 + \nu\cos(2\gamma)) \\ 1 + \epsilon\cos(2\alpha))(1 - \nu\cos(2\gamma)) \\ 1 - \epsilon\cos(2\alpha))(1 - \nu\cos(2\gamma)) \end{bmatrix} \quad \text{Equation 27}$$

In some embodiments, module 64 computes an empirical covariance matrix $R_{emp}$ by averaging $H^H H$ over a certain time/frequency range, and decomposing the averaged matrix according to:

$$R_{emp} = V_{emp} D_{emp} V_{emp}^H \quad \text{Equation 28}$$

In various embodiments, module 64 estimates the four parameters ($\alpha, \beta, \gamma, \eta$) from any one of the four eigenvectors, or from some optimal combination of them. In an example embodiment, module 64 uses only the strongest eigenvector for estimation, since the contribution of the weaker eigenvectors is typically noisier. Moreover, as explained further below, there is ambiguity in the SVD components with regard to their column order, which may complicate the estimation process. Using only the strongest eigenvector eliminates this ambiguity. In this embodiment, module 64 identifies the strongest eigenvector $V_{1\text{-}emp}$ of the empirical covariance matrix. Module 64 cancels any redundant phase (that is inherent in the SVD) by the following normalization, so as to ensure the top element is real-positive:

$$\hat{V}_1 = V_{1\text{-}emp} \times \frac{V_{1\text{-}emp}^*(1)}{|V_{1\text{-}emp}^*(1)|} \quad \text{Equation 29}$$

Module 64 estimates $\beta$ and $\eta$ by:

$$\hat{\Phi}_{ii} = [-\text{Im}(\text{Log}\hat{V}_1(i))](\text{mod } 2\pi) = -\tan^{-1}\left(\frac{\text{Im}\hat{V}_1(i)}{\text{Re}\hat{V}_1(i)}\right) \quad \text{Equation 30}$$

$\hat{\beta} = \hat{\Phi}_{22}$ $\hat{\eta} = (\hat{\Phi}_{33} + [(\hat{\Phi}_{44} - \hat{\beta})(\text{mod } 2\pi)])/2$ Module 64 estimates $\alpha$ and $\gamma$ by:

$\hat{\Psi}_1 = e^{j\hat{\Phi}}\hat{V}_1$ \quad Equation 31

Module 64 obtains the values of $\alpha+\gamma$ and $\alpha-\gamma$ by (the left-hand-sides of the following equation should be regarded as composite symbol names and not products of single-letter variables):

$apγc = \cos^{-1}(\hat{\Psi}_1(1) - \hat{\Psi}_1(4))$ $apγs = \sin^{-1}(\hat{\Psi}_1(2) + \hat{\Psi}_1(3))$ $amγc = \cos^{-1}(\hat{\Psi}_1(1) + \hat{\Psi}_1(4))$ $amγs = \sin^{-1}(\hat{\Psi}_1(2) - \hat{\Psi}_1(3))$ \quad Equation 32

In an embodiment, module 64 then averages the terms $\cos^{-1}()$ and $\sin^{-1}()$ after resolving the ambiguity of the $\sin^{-1}()$ function. Alternatively, module 64 uses only the $\cos^{-1}()$ term, sacrificing some Signal to Noise Ratio (SNR) gain:

if $(|(\pi - apγs) - apγc| < |apγs - apγc|)$ \quad Equation 33

$apγs = \pi - apγs$ if $(|(\pi - amγs) - amγc| < |amγs - amγc|)$ $amγs = \pi - amγs$ $apγ = \frac{1}{2}(apγc + apγs)$ $amγ = \frac{1}{2}(amγc + amγs)$ $\hat{\alpha} = \frac{1}{2}(apγ + amγ)$ $\hat{\gamma} = apγ - \hat{\alpha}$ In an embodiment, module 64 begins the estimation of the eigenvalues of the inter-polarization and intra-polarization parts by calculating:

$\mu = Tr(D_{emp})/4$ \quad Equation 34

The elements of $D_{emp}$ may require sorting in order to identify them with the matrix elements in Equation 12 above. By definition, the largest element corresponds to $(1+\epsilon)\cdot(1+\nu)$, and the smallest element corresponds to $(1-\epsilon)\cdot(1-\nu)$. However, there is no guarantee as to which of the two remaining elements corresponds to $(1-\epsilon)\cdot(1+\nu)$ and which to $(1+\epsilon)\cdot(1-\nu)$. In an embodiment, module 64 therefore tests the two hypotheses and chooses the one that exhibits the best fit between the empirical and modeled R.

For the first hypothesis, ε>ν, module 64 evaluates:

$$\tilde{D} = \frac{1}{\mu} D_{emp}([4,2,3,1], [4,2,3,1])$$

$$\varepsilon 1 = \frac{1}{2}(\tilde{D}_{11} + \tilde{D}_{33}) - 1$$

$$\varepsilon 2 = -\frac{1}{2}(\tilde{D}_{22} + \tilde{D}_{44}) + 1$$

$$\hat{\varepsilon}_1 = \frac{1}{2}(\varepsilon 1 + \varepsilon 2)$$

$$\nu 1 = \frac{1}{2}(\tilde{D}_{11} + \tilde{D}_{22}) - 1$$

$$\nu 2 = -\frac{1}{2}(\tilde{D}_{33} + \tilde{D}_{44}) + 1$$

$$\hat{\nu}_1 = \frac{1}{2}(\nu 1 + \nu 2)$$

Equation 35

For the second hypothesis, ε<ν, module 64 evaluates:

$$\tilde{D} = \frac{1}{\mu} D_{emp}([4,3,2,1], [4,3,2,1])$$

$$\varepsilon 1 = \frac{1}{2}(\tilde{D}_{11} + \tilde{D}_{33}) - 1$$

$$\varepsilon 2 = -\frac{1}{2}(\tilde{D}_{22} + \tilde{D}_{44}) + 1$$

$$\hat{\varepsilon}_2 = \frac{1}{2}(\varepsilon 1 + \varepsilon 2)$$

$$\nu 1 = \frac{1}{2}(\tilde{D}_{11} + \tilde{D}_{22}) - 1$$

$$\nu 2 = -\frac{1}{2}(\tilde{D}_{33} + \tilde{D}_{44}) + 1$$

$$\hat{\nu}_2 = \frac{1}{2}(\nu 1 + \nu 2)$$

Equation 36

Module 64 then computes the Euclidean distance between diag(R) and diag($R_{emp}$) under the two hypotheses, and selects the hypothesis resulting in the smaller distance. In other words, we define:

$$d_i = \left\| \mu \begin{bmatrix} (1 + \hat{\varepsilon}_i \cos(2\hat{\alpha}))(1 + \hat{\nu}_i \cos(2\hat{\gamma})) \\ (1 - \hat{\varepsilon}_i \cos(2\hat{\alpha}))(1 + \hat{\nu}_i \cos(2\hat{\gamma})) \\ (1 + \hat{\varepsilon}_i \cos(2\hat{\alpha}))(1 - \hat{\nu}_i \cos(2\hat{\gamma})) \\ (1 - \hat{\varepsilon}_i \cos(2\hat{\alpha}))(1 - \hat{\nu}_i \cos(2\hat{\gamma})) \end{bmatrix} - \text{diag}(R_{emp}) \right\|$$

Equation 37 wherein i=1, 2 denotes the hypothesis index, and the winning hypothesis is the one producing the smallest d.

In some embodiments, module 64 carries out a two-stage process that calculates the intra-polarization feedback at coarse granularity and the inter-polarization feedback at fine granularity. In an embodiment, module 64 computes a long-term empirical R (denoted by $R_{WB}$) by averaging $H^H H$ over a relatively long time and (possibly) wideband frequency sub-bands. Module 64 then follows the above-described process to estimate α, β, and ε from $R_{WB}$. The estimated values are denoted $\alpha_{WB}$, $\beta_{WB}$, and $\varepsilon_{WB}$, respectively. Module 64 further computes a short-term empirical R (denoted $R_{SB}$) by averaging $H^H H$ over a relatively short time and (possibly) narrow-band frequency sub-bands. Module 64 repeats the above-described process to estimate γ, η, and ν from $R_{SB}$.

In the latter process, however, the calculation of $\hat{\eta}$ in Equation 30, the calculation of $\hat{\gamma}$ in Equation 33 and the calculation of $d_i$ in Equation 37 are replaced by:

$$\hat{\eta} = [(\hat{\Phi}_{33} + (\hat{\Phi}_{44} - \hat{\beta}_{WB})(\text{mod } 2\pi)]/2$$

$$\hat{\gamma} = \alpha p \gamma - \hat{\alpha}_{WB}$$

$$d_i = \left\| \mu \begin{bmatrix} (1 + \hat{\varepsilon}_{WB}\cos(2\hat{\alpha}_{WB}))(1 + \hat{\nu}_i \cos(2\hat{\gamma})) \\ (1 - \hat{\varepsilon}_{WB}\cos(2\hat{\alpha}_{WB}))(1 + \hat{\nu}_i \cos(2\hat{\gamma})) \\ (1 + \hat{\varepsilon}_{WBi}\cos(2\hat{\alpha}_{WB}))(1 - \hat{\nu}_i \cos(2\hat{\gamma})) \\ (1 - \hat{\varepsilon}_{WB}\cos(2\hat{\alpha}_{WB}))(1 - \hat{\nu}_i \cos(2\hat{\gamma})) \end{bmatrix} - \text{diag}(R_{emp}) \right\|$$

Equation 38

When implementing the disclosed techniques, BS 24 is typically configured to receive the inter-polarization and intra-polarization feedback at different time/frequency granularities, and to combine the two feedback types. In some embodiments, the time/frequency granularity for each feedback type is configurable, e.g., set by the BS and signaled to the UE.

When implementing the disclosed techniques, in an embodiment the BS and UE use an agreed convention with regard to indexing the transmit antennas. The disclosed techniques can be used with any suitable antenna indexing scheme. For an eight-antenna configuration, for example, in one scheme antennas A1,A2,A3,A4 have one polarization, and antennas A5,A6,A7,A8 have the orthogonal polarization. This scheme was used in the examples above. In another scheme, antennas A2,A4,A6,A8 have one polarization, and antennas A1,A3,A5,A7 have the orthogonal polarization. The second scheme can be defined irrespective of the number of antennas: One set comprises the even-order antennas and the other set comprises the odd-order antennas. When using this indexing scheme with Kronecker-based partitioning of the feedback, the order of multiplication in the Kronecker product should be reversed (e.g., to $R_{ULA} \otimes R_{POL}$ in Equation 2, and to $V_{ULA} \otimes V_{POL}$ in Equation 18).

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   receiving a Multiple-Input Multiple Output (MIMO) signal over multiple communication channels from an antenna array including a first set of antennas having a first polarization and a second set of the antennas having a second polarization that is orthogonal to the first polarization;
   calculating first feedback information relating to first interrelations between the antennas within either the first set or the second set;
   calculating second feedback information relating at least to second interrelations between the first set and the second set of the antennas; and
   transmitting at least part of the first feedback information at a first time/frequency granularity, and transmitting the second feedback information, plus a portion of the first feedback information that relates only to the interrelations between the antennas within either the first set or the second set and not to the interrelations between the first set and the second set of the antennas, at a second time/frequency granularity that is finer than the first time/frequency granularity, wherein the portion of the first feedback information includes a normalization factor for an overall Dower of the signal.

2. The method according to claim 1, wherein calculating the first and second feedback information comprises calculating a feedback matrix, which is represented as a Kronecker product of a first matrix depending on the first interrelations and a second matrix depending on the second interrelations.

3. The method according to claim 2, wherein transmitting the at least part of the first feedback information and the second feedback information comprises reporting the first matrix at the first time/frequency granularity and reporting the second matrix at the second time/frequency granularity.

4. The method according to claim 2, wherein calculating the feedback matrix comprises estimating elements of a Spatial Correlation Function (SCF) matrix.

5. The method according to claim 2, wherein calculating the feedback matrix comprises selecting a precoding matrix to be applied for subsequent transmission of the MIMO signal.

6. The method according to claim 5, wherein selecting the precoding matrix comprises choosing the precoding matrix from a predefined set of precoding matrices, at least some of which are represented as Kronecker products of respective first matrices depending on the first interrelations and respective second matrices depending on the second interrelations.

7. The method according to claim 1, wherein transmitting the at least part of the first feedback information and the second feedback information at the first and second time/frequency granularities comprises transmitting only the second feedback information and not the first feedback information.

8. The method according to claim 1, wherein calculating the second feedback comprises computing the second feedback based on at least one additional feedback parameter, which depends on one or more of the antennas in the first set and one or more of the antennas in the second set.

9. The method according to claim 1, wherein calculating the first feedback information comprises computing the first feedback information over first time intervals and over first frequency bands, and wherein calculating the second feedback information comprises computing the second feedback information over second time intervals that are shorter than the first time intervals, and over second frequency bands that are narrower than the first frequency bands.

10. An apparatus, comprising:
a receiver, which is configured to receive a Multiple-Input Multiple Output (MIMO) signal over multiple communication channels from an antenna array including a first set of antennas having a first polarization and a second set of the antennas having a second polarization that is orthogonal to the first polarization;
a processor, which is configured to calculate, based on the MIMO signal received by the receiver, first feedback information relating to first interrelations between the antennas within either the first set or the second set, and to calculate second feedback information relating at least to second interrelations between the first set and the second set of the antennas; and
a transmitter, which is configured to transmit at least part of the first feedback information calculated by the processor at a first time/frequency granularity, and to transmit the second feedback information calculated by the processor, plus a portion of the first feedback information that relates only to the interrelations between the antennas within either the first set or the second set and not to the interrelations between the first set and the second set of the antennas, at a second time/frequency granularity that is finer than the first time/frequency granularity, wherein the portion of the first feedback information includes a normalization factor for an overall power of the signal.

11. The apparatus according to claim 10, wherein the processor is configured to calculate the first and second feedback information by calculating a feedback matrix, which is represented as a Kronecker product of a first matrix depending on the first interrelations and a second matrix depending on the second interrelations.

12. The apparatus according to claim 11, wherein the transmitter is configured to report the first matrix at the first time/frequency granularity and to report the second matrix at the second time/frequency granularity.

13. The apparatus according to claim 11, wherein the processor is configured to calculate the feedback matrix by estimating elements of a Spatial Correlation Function (SCF) matrix.

14. The apparatus according to claim 11, wherein the processor is configured to calculate the feedback matrix by selecting a precoding matrix to be applied for subsequent transmission of the MIMO signal.

15. The apparatus according to claim 14, wherein the processor is configured to choose the precoding matrix from a predefined set of precoding matrices, at least some of which are represented as Kronecker products of respective first matrices depending on the first interrelations and respective second matrices depending on the second interrelations.

16. The apparatus according to claim 10, wherein the transmitter is configured to transmit only the second feedback information and not the first feedback information.

17. The apparatus according to claim 10, wherein the processor is configured to compute the second feedback based on at least one additional feedback parameter, which depends on one or more of the antennas in the first set and one or more of the antennas in the second set.

18. A mobile communication terminal comprising the apparatus of claim 10.

19. A chipset for processing signals in a mobile communication terminal, comprising the apparatus of claim 10.

20. An apparatus, comprising:
an antenna array, which comprises a first set of antennas having a first polarization and a second set of the antennas having a second polarization that is orthogonal to the first polarization;
a transmitter, which is configured to transmit a Multiple-Input Multiple Output (MIMO) signal over multiple communication channels using the antenna array;
a receiver, which is configured to receive using the antenna array, at a first time/frequency granularity, at least part of first feedback information relating to first interrelations between the antennas within either the first set or the second set, and to receive, at a second time/frequency granularity that is finer than the first time/frequency granularity, second feedback information relating at least to second interrelations between the first set and the second set of the antennas, plus a portion of the first feedback information that relates only to the interrelations between the antennas within either the first set or the second set and not to the interrelations between the first set and the second set of the antennas, wherein the portion of the first feedback information includes a normalization factor for an overall power of the signal; and a processor, which is configured to combine the first and second feedback information received by the receiver, and to adapt transmission of the MIMO signal based on the combined first and second feedback.

* * * * *